(12) United States Patent
Matsushita

(10) Patent No.: US 9,436,319 B2
(45) Date of Patent: Sep. 6, 2016

(54) COORDINATE INPUT APPARATUS, METHOD THEREOF, AND STORAGE MEDIUM

(71) Applicant: CANON KABUSHIKI KAISHA, Tokyo (JP)

(72) Inventor: Akihiro Matsushita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/557,405

(22) Filed: Dec. 1, 2014

(65) Prior Publication Data

US 2015/0169097 A1 Jun. 18, 2015

(30) Foreign Application Priority Data

Dec. 18, 2013 (JP) ................. 2013-261840

(51) Int. Cl.
*G06F 3/041* (2006.01)
*G06F 3/042* (2006.01)

(52) U.S. Cl.
CPC .................. *G06F 3/0428* (2013.01)

(58) Field of Classification Search
CPC ....................... G06F 3/0412–3/0421
USPC ........... 345/156–184, 419; 705/7.32; 702/41, 702/61; 73/12.06; 715/766, 810, 848
See application file for complete search history.

(56) References Cited

U.S. PATENT DOCUMENTS

| 5,748,110 A * | 5/1998 | Sekizawa | G06F 3/046 178/18.07 |
| 7,639,238 B2 * | 12/2009 | Hauck | G06F 3/0418 345/173 |
| 8,838,410 B2 | 9/2014 | Yoshimura | |
| 8,941,622 B2 | 1/2015 | Kobayashi et al. | |
| 2005/0200612 A1 * | 9/2005 | Tanaka | G06F 3/0421 345/175 |
| 2006/0232568 A1 * | 10/2006 | Tanaka | G06F 3/03545 345/175 |
| 2008/0192107 A1 * | 8/2008 | Griffin | B41M 5/267 347/238 |
| 2008/0291164 A1 * | 11/2008 | Tanaka | G06F 3/0421 345/158 |
| 2011/0025649 A1 * | 2/2011 | Sheikhzadeh Nadjar | G06F 3/043 345/177 |
| 2012/0065929 A1 | 3/2012 | Yoshimura | |
| 2012/0068953 A1 * | 3/2012 | Chang | G06F 3/0416 345/173 |
| 2012/0068955 A1 * | 3/2012 | Hill | G06F 3/0428 345/173 |
| 2012/0256874 A1 * | 10/2012 | Jiyama | G06F 3/0418 345/174 |
| 2013/0234955 A1 * | 9/2013 | Takano | G06F 3/0421 345/173 |
| 2013/0249854 A1 * | 9/2013 | Katsurahira | G06F 3/0416 345/174 |
| 2013/0257814 A1 * | 10/2013 | Kobayashi | G06F 3/0428 345/175 |
| 2013/0321318 A1 * | 12/2013 | Okano | G06F 3/044 345/173 |

(Continued)

FOREIGN PATENT DOCUMENTS

| JP | 2004-272353 A | 9/2004 |
| JP | 2012-059228 A | 3/2012 |
| JP | 2012-234413 A | 11/2012 |

*Primary Examiner* — Prabodh M Dharia

(74) *Attorney, Agent, or Firm* — Fitzpatrick, Cella, Harper & Scinto

(57) ABSTRACT

A coordinate input apparatus which detects a position pointed in a region surrounded by at least four sensor units, based on detection outputs from two sensor units corresponding to the pointed position out of the at least four sensor units stores, in a memory unit, correction values which are based on respective detection outputs of a plurality of combinations each of two sensor units out of the at least four sensor units for one position corresponding to the plurality of combinations, and calculates the pointed position based on the detection outputs from two sensor units corresponding to the pointed position, and the correction values stored in the memory unit.

19 Claims, 11 Drawing Sheets

(56) References Cited

U.S. PATENT DOCUMENTS

| | | | | |
|---|---|---|---|---|
| 2014/0034807 A1* | 2/2014 | Machii | ............ | G06F 3/0421 250/206.1 |
| 2014/0062963 A1* | 3/2014 | Matsushita | ............ | G06F 3/0421 345/175 |
| 2014/0188561 A1* | 7/2014 | Tenbrock | ............ | G06F 21/316 705/7.32 |
| 2014/0204059 A1* | 7/2014 | Geaghan | ............ | G06F 3/0416 345/174 |
| 2014/0285472 A1* | 9/2014 | Raynor | ............ | G06F 3/0416 345/175 |

\* cited by examiner

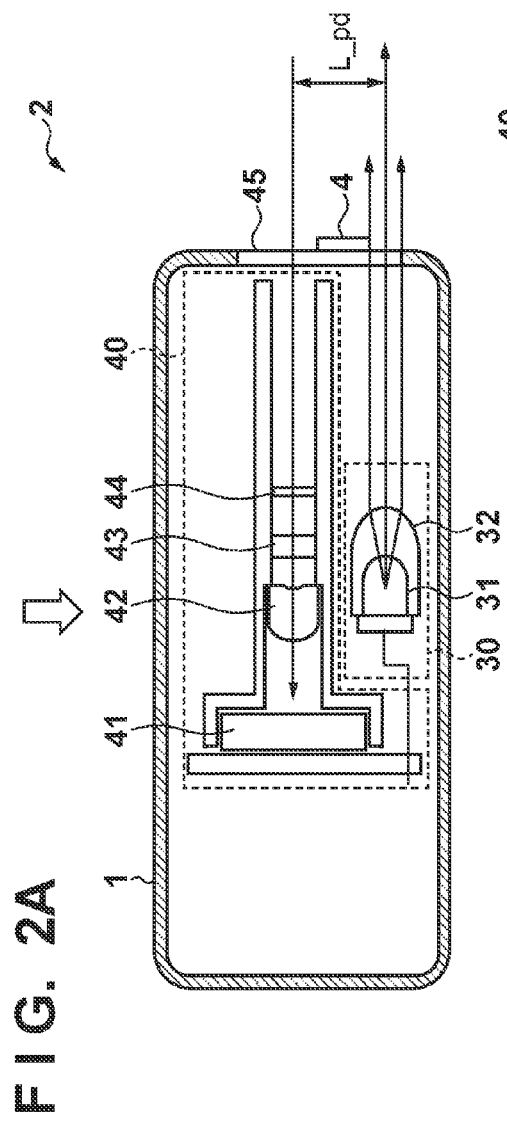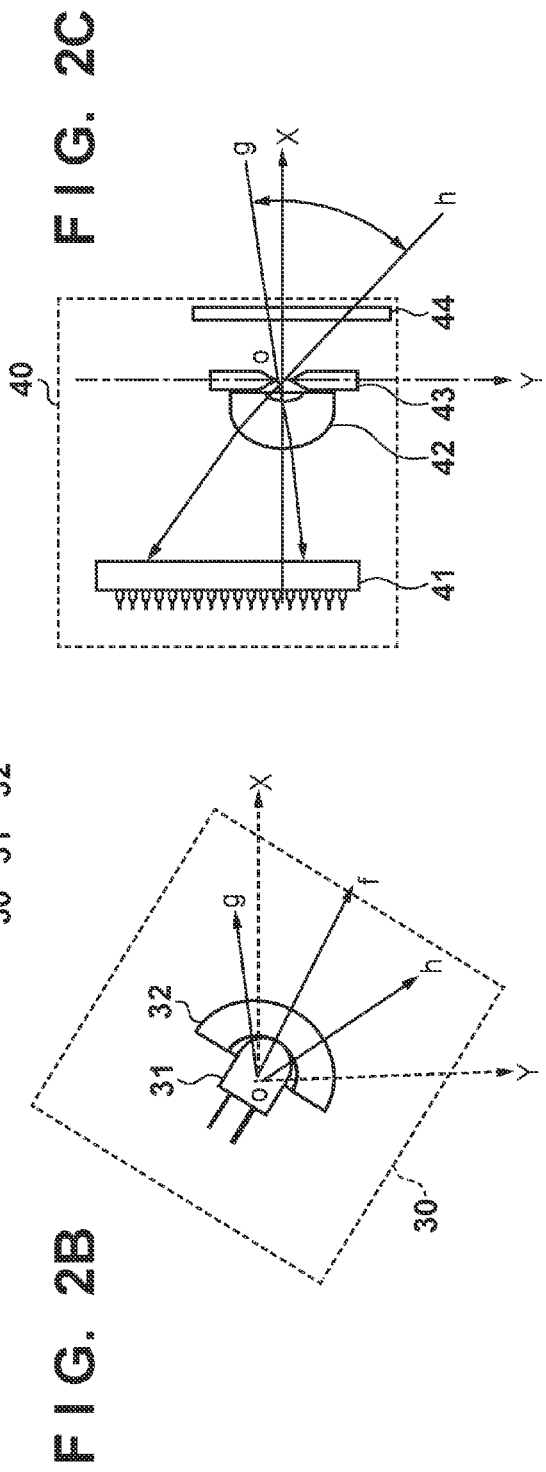

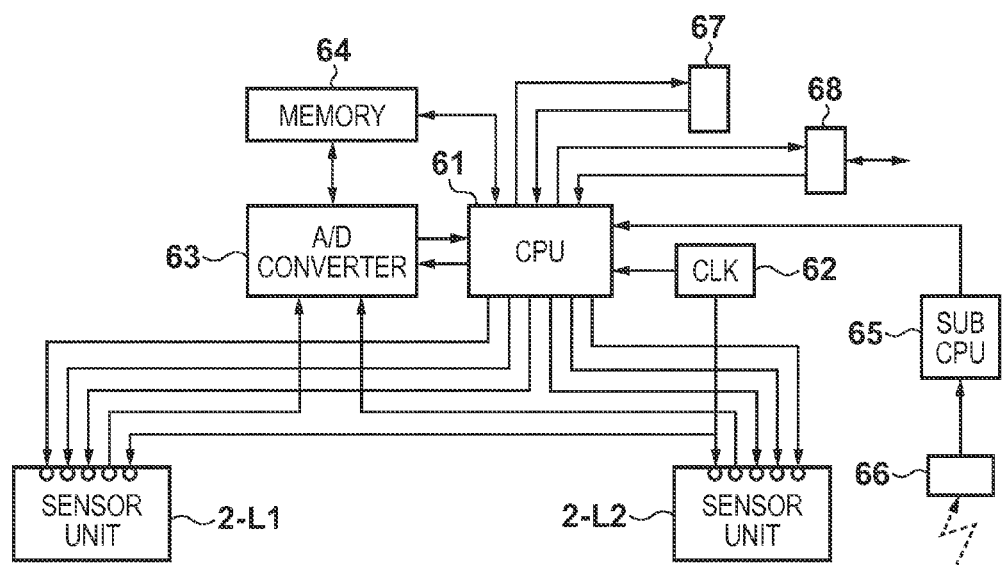
F I G. 3

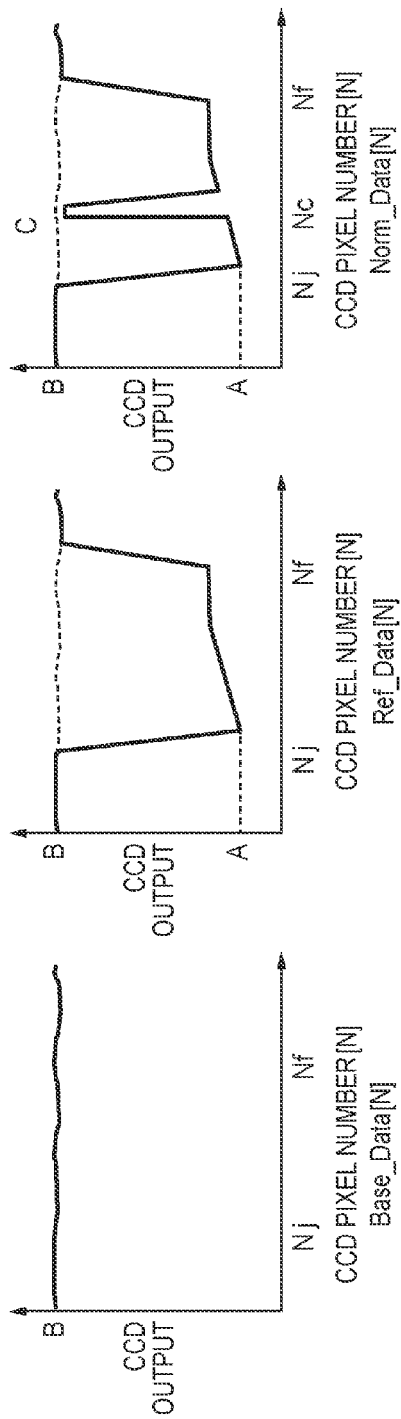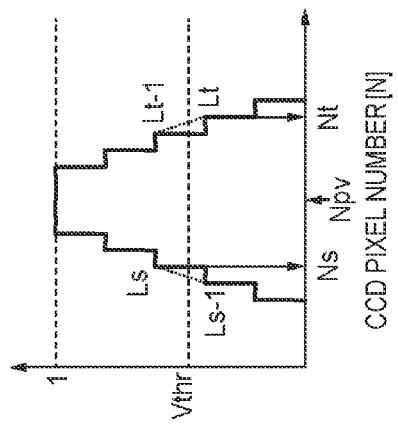

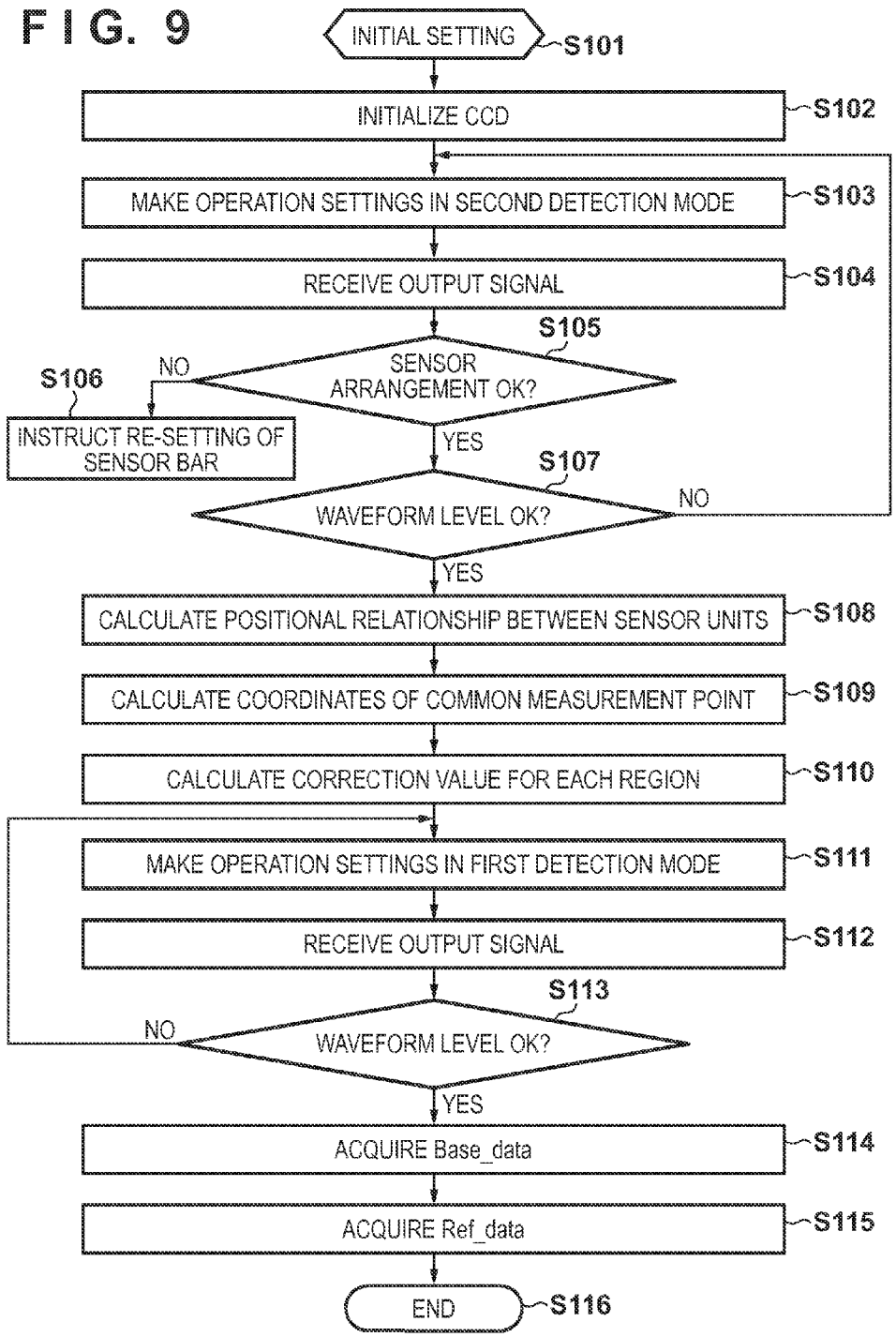

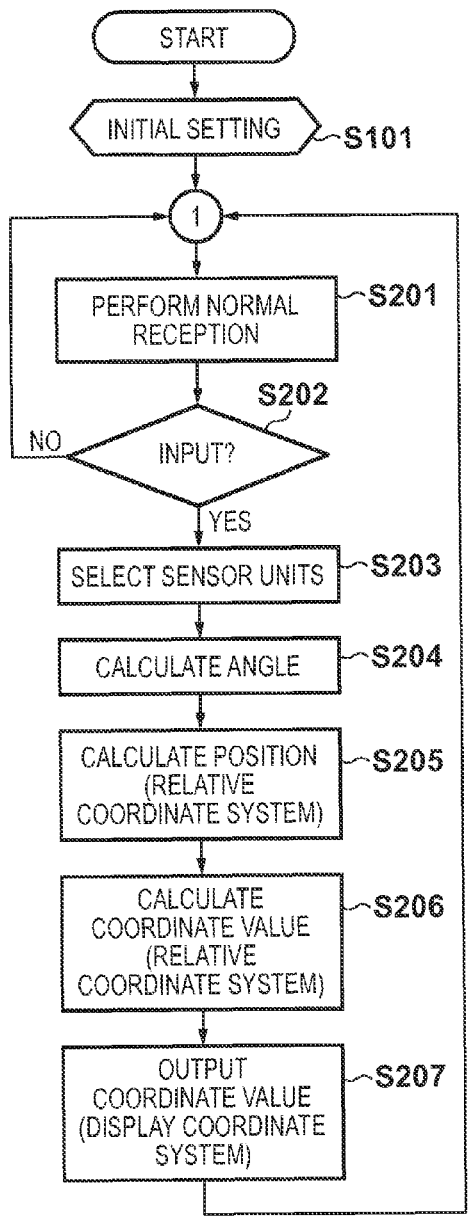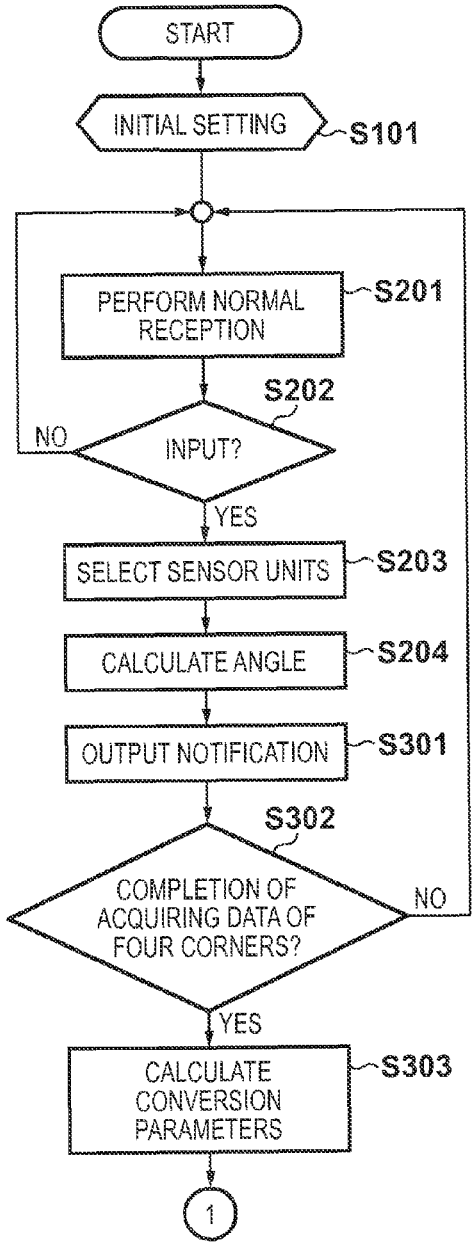
FIG. 10A
FIG. 10B

COORDINATE INPUT APPARATUS, METHOD THEREOF, AND STORAGE MEDIUM

BACKGROUND OF THE INVENTION

1. Field of the Invention

The present invention relates to a coordinate input apparatus which detects a coordinate position input to a coordinate input surface by a pointer such as a finger in order to input or select information, and a method thereof.

2. Description of the Related Art

Various types of coordinate input apparatuses (touch panels and digitizers) have conventionally been proposed or commercialized. For example, a touch panel is used, which makes it possible to easily operate a terminal such as a PC (Personal Computer) by touching the screen with a finger without using a special tool or the like.

There are various coordinate input methods ranging from a method using a resistive film to a method using an ultrasonic wave. As a method using light, a method (light shielding method) is known, in which a retroreflecting member is arranged outside a coordinate input surface and reflects light from a light projecting unit, and a light receiving unit detects the light amount distribution (see, for example, Japanese Patent Laid-Open No. 2004-272353). This method detects the direction of a light shielding portion (region) where light is cut off with a finger or the like in the coordinate input region, and determines the coordinates of the light shielding position, that is, the coordinate input position.

Japanese Patent Laid-Open No. 2012-234413 has disclosed an invention for implementing a coordinate input apparatus for a large screen by a compact system using many sensor units. United States Patent Publication No. 2012/0065929 has disclosed a system in which a device can be set at an arbitrary position to improve user friendliness.

By integrating a coordinate input apparatus of this type with a display apparatus, the display state can be controlled by touching the display screen of the display apparatus, or the locus of a pointed position can be displayed as handwriting as in the relationship between paper and a pencil. A typical example of this is a mobile device such as a smartphone. Along with upsizing of flat panel displays, it is becoming popular to combine the flat panel display with a large-size touch panel and introduce it into, for example, the digital signage field.

In such an apparatus, several errors are generated owing to its structure. For example, a light receiving device such as a CCD line sensor or CMOS sensor is used as a light receiving unit which detects light. Since each pixel receives light in the light receiving device, a quantization error is generated at this time. When converting the number of a pixel detected by the light receiving device into an angle value, a method such as table lookup or conversion by polynomial approximation is adopted. However, a slight error is generated in either method.

For example, when the apparatus is permanently attached to a housing, the number of a pixel indicating a reference angle in the horizontal direction or the like that is used for coordinate calculation is measured and recorded in the internal memory of the apparatus at the time of, for example, assembling the apparatus. At this time, a measurement error or the like is generated. If the attaching position of the apparatus shifts owing to aged deterioration or the like, an error may be further generated. Owing to various error factors as mentioned above, an angle detected by the sensor has an error.

If an angle detected by the sensor unit has an error, calculated coordinates on the screen do not match a touched position. To reduce the difference between them, a generated error needs to be reduced by, for example, increasing the pixel resolution of the light receiving device or the mechanical precision of the apparatus. In practice, the design level is determined in consideration of the cost, the function/performance balance, and the like.

Japanese Patent Laid-Open No. 2012-234413 has disclosed a system which changes a combination of sensor units, divides the screen into a plurality of regions, and calculates a pointed position. In this system, if an error is generated in an angle detected by the sensor unit, another problem that coordinate values do not coincide with each other at the boundaries between the plurality of divided regions is generated, in addition to the problem that a touched position and calculated coordinates on the screen do not match each other. The other problem arises from the difference in the appearance of an error (direction and distance of an error) between the plurality of divided regions. For example, when drawing is performed on the screen, coordinates become discontinuous at specific positions. Such an error is very noticeable.

SUMMARY OF THE INVENTION

The present invention improves the discontinuity of coordinates at the boundary between regions when an effective coordinate input region is divided into a plurality of regions and the coordinates of a pointed position are calculated.

In order to achieve the above object, a coordinate input apparatus according to the present invention has the following arrangement.

A coordinate input apparatus which detects a position pointed in a region surrounded by at least four sensor units, based on detection outputs from two sensor units corresponding to the pointed position out of the at least four sensor units, comprising: a storage unit configured to store, in a memory unit, correction values which are based on respective detection outputs of a plurality of combinations each of two sensor units out of the at least four sensor units for one position corresponding to the plurality of combinations; and a calculation unit configured to calculate the pointed position based on the detection outputs from two sensor units corresponding to the pointed position, and the correction values stored in the memory unit.

Further features of the present invention will become apparent from the following description of exemplary embodiments with reference to the attached drawings.

BRIEF DESCRIPTION OF THE DRAWINGS

FIGS. 2A to 2C are views showing the detailed arrangement of a sensor unit according to the first embodiment;

FIG. 3 is a block diagram for explaining the arrangement of an arithmetic control circuit according to the first embodiment;

FIGS. 4A to 4D are graphs for explaining processing of a detection signal waveform according to the first embodiment;

FIG. 9 is a flowchart showing initial setting processing according to the first embodiment;

FIGS. 10A and 10B are flowcharts showing a normal operation and calibration processing according to the first embodiment;

DESCRIPTION OF THE EMBODIMENTS

Embodiments of the present invention will now be described in detail with reference to the accompanying drawings. Note that arrangements set forth in the following embodiments are merely examples, and the present invention is not limited to illustrated arrangements.

The schematic arrangement of a coordinate input apparatus according to the first embodiment will be explained with reference to FIG. 1.

Figure 1:
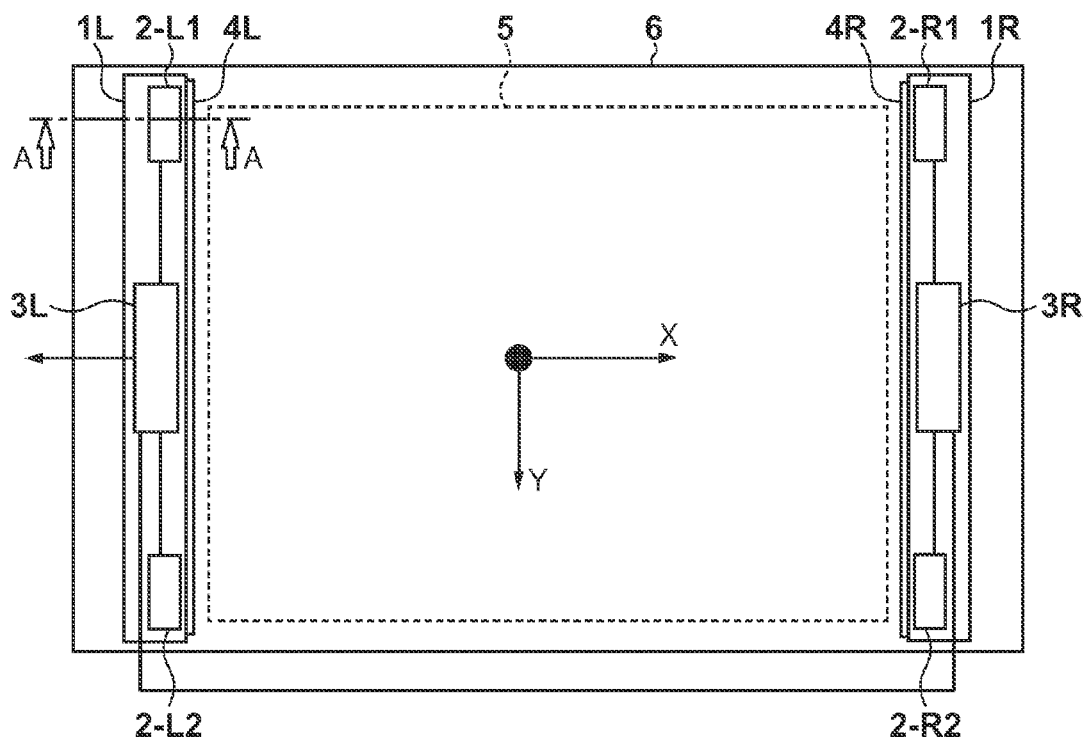
FIG. 1 is a view showing the schematic arrangement of a coordinate input apparatus according to the first embodiment.

In FIG. 1, a sensor bar 1L is a housing equipped with at least two sensor units 2-L1 and 2-L2 (first and second sensor units) serving as angle detection sensor units. A sensor bar 1R is a housing equipped with sensor units 2-R1 and 2-R2 (third and fourth sensor units).

As shown in FIG. 1, the sensor bars 1L and 1R (to be generically referred to as sensor bars 1) are arranged outside two facing sides of a rectangular effective coordinate input region 5. The sensor bars 1L and 1R are parallel and have the same length.

If a display apparatus is a front projector, the display region is set within the range of the effective coordinate input region 5 and projected onto a flat whiteboard 6, a wall surface, or the like.

As shown in FIG. 1, retroreflecting members 4L and 4R (to be generically referred to as retroreflecting members 4) are attached to the side surfaces of the sensor bars 1L and 1R, respectively. Each of the retroreflecting members 4L and 4R is configured so that it can retroreflect infrared light projected from the sensor unit of the sensor bar 1L or 1R arranged on a facing side.

The sensor bar 1L incorporates the sensor units 2-L1 and 2-L2, and the sensor bar 1R incorporates the sensor units 2-R1 and 2-R2. An arithmetic control circuit 3L incorporated in the sensor bar 1L controls the sensor units 2-L1 and 2-L2, performs arithmetic processing on the output results, and controls an arithmetic control circuit 3R of the sensor bar 1R. The arithmetic control circuit 3R of the sensor bar 1R controls the sensor units 2-R1 and 2-R2, performs arithmetic processing on the output results, and transmits the results to the arithmetic control circuit 3L of the sensor bar 1L.

The arithmetic control circuit 3L of the sensor bar 1L processes output results from the four sensor units 2-L1, 2-L2, 2-R1, and 2-R2, calculates a pointed position (touch position), and outputs the results to an external device such as a personal computer.

In FIG. 1, the arithmetic control circuit 3L of the sensor bar 1L and the arithmetic control circuit 3R of the sensor bar 1R are connected by a wire or wirelessly.

In the following description, the horizontal direction is the X-axis (positive on the right side in the drawing), and the vertical direction is the Y-axis (positive on the down side).

FIGS. 2A to 2C are views showing the detailed arrangement of the sensor units 2-L1, 2-L2, 2-R1, and 2-R2 (to be generically referred to as sensor units 2). FIG. 2A shows a section A-A in FIG. 1, and FIGS. 2B and 2C are front views when viewed from a direction (direction perpendicular to the effective coordinate input region 5) indicated by an arrow in FIG. 2A.

In FIG. 2A, the sensor unit 2 is housed in the sensor bar 1, and constituted by a light projecting unit 30 which projects light toward the effective coordinate input region 5, and a light receiving unit 40 which receives incoming light. The distance between the light projecting unit 30 and the light receiving unit 40 in the direction perpendicular to the effective coordinate input region 5 is L_pd, and the retroreflecting member 4 is interposed between them, as shown in FIG. 2A. A light transmitting member 45 is a protection member for preventing entrance of a foreign substance such as dust into the sensor bar 1.

In FIG. 2B, the light projecting unit 30 includes an infrared LED 31 serving as a light emitting unit, a projection lens 32, and an adhesion layer for fixing them. The projection lens 32 is configured to change light emitted by the infrared LED 31 into a beam almost parallel to the whiteboard 6 serving as the coordinate input surface. A fan-like beam having a vertex at the position of a point O (the barycentric position of the sensor unit 2) in a light projecting range of g to h emerges so as to illuminate the entire region of the retroreflecting member 4 of the sensor bar 1 arranged on a facing side.

In FIG. 2C, the light receiving unit 40 detects light which has been projected by the light projecting unit 30 and retroreflected by the retroreflecting member 4 attached to the sensor bar 1 arranged on a facing side. Reference numeral 41 denotes a line CCD serving as a photoelectric converter; 42, a light receiving lens; 43, a field stop; and 44, an infrared pass filter. The infrared pass filter 44 may be omitted by giving the infrared pass filter function to a protection member 45.

The optical axis of the light receiving unit 40 is set in the X-axis direction. The field range is a range of g to h, and the position of the point O serves as an optical center position. As shown in FIG. 2C, the light receiving unit 40 is an optical system asymmetric to the optical axis. The light projecting unit 30 and the light receiving unit 40 are arranged to overlap each other, as shown in FIG. 2A, so that the position of the point O, the direction g, and the direction h become almost coincident between the light projecting unit 30 and the light receiving unit 40. Since the light receiving unit 40 condenses light to a pixel of the line CCD 41 in accordance with the direction of incident light, the pixel number of the line CCD 41 represents angle information of incident light.

The light receiving unit 40 has a field range substantially parallel to the coordinate input surface of the effective coordinate input region 5. The light receiving unit 40 is arranged so that its optical axis direction coincides with the normal direction of the light receiving surface of the line CCD 41.

FIG. 3 is a block diagram showing the arithmetic control circuit 3. The arithmetic control circuit 3L of the sensor bar 1L and the arithmetic control circuit 3R of the sensor bar 1R in the first embodiment have the same circuit arrangement except for an external interface specification, and perform control of the corresponding connected sensor units 2 and arithmetic processing. FIG. 3 particularly shows the arrangement of the arithmetic control circuit 3L of the sensor bar 1L.

A CPU 61 constituted by a one-chip microcomputer or the like outputs CCD control signals for the line CCDs 41 of the sensor units 2-L1 and 2-L2, and performs control of the shutter timings and data output of the line CCDs 41, and the like. CCD clocks are transmitted from a clock generator CLK 62 to the sensor units 2-L1 and 2-L2, and also input to the CPU 61 in order to perform various control operations in synchronism with the line CCDs 41. Note that the CPU 61 supplies LED driving signals for driving the infrared LEDs 31 of the sensor units 2-L1 and 2-L2.

An A/D converter 63 receives detection signals from the line CCDs 41 of the sensor units 2-L1 and 2-L2, and converts them into digital values under the control of the CPU 61. A memory 64 stores the converted digital values to use them for angle calculation. A geometric pointed position is calculated from the calculated angle information, and output to an information processing apparatus such as an external PC via an interface 68 (for example, a USB interface).

As described above, the arithmetic control circuit 3 of each sensor bar 1 controls the two sensor units 2. If the arithmetic control circuit 3L of the sensor bar 1L acts as a main function, the CPU 61 transmits a control signal to the arithmetic control circuit 3R of the sensor bar 1R via a serial communication unit 67 to synchronize the circuits. Then, the CPU 61 acquires necessary data from the arithmetic control circuit 3R.

The operation between the arithmetic control circuits 3L and 3R is executed by master-slave control. In the first embodiment, the arithmetic control circuit 3L serves as the master, and the arithmetic control circuit 3R serves as the slave. Note that each arithmetic control circuit can become either the master or slave, and a switching unit such as a DIP switch (not shown) can switch the arithmetic control circuit between the master and the slave by inputting a switching signal to the port of the CPU.

To acquire data from the sensor units 2-R1 and 2-R2 of the sensor bar 1R arranged on a facing side, the arithmetic control circuit 3L of the sensor bar 1L serving as the master transmits a control signal to the arithmetic control circuit 3R serving as the slave via the serial communication unit 67. Angle information obtained by the sensor units 2-R1 and 2-R2 is calculated and transmitted to the arithmetic control circuit 3L serving as the master via the serial communication unit 67.

In the first embodiment, the interface 68 is mounted in the arithmetic control circuit 3L serving as the master. Reference numeral 66 denotes an infrared receiving unit when a special-purpose pen (not shown) for emitting an infrared ray is used is a pointer. A sub-CPU 65 decodes a signal from the special-purpose pen. The special-purpose pen includes a switch which detects pressing of the input surface by the pen tip, and various switches arranged on the side of the pen housing. The operation state of the special-purpose pen can be detected by transmitting the states of these switches and pen identification information from the infrared emitting unit of the special-purpose pen.

As described in the U.S. patent application Ser. No. 13/973,651, filed Aug. 22, 2013, which is incorporated by reference, the sensor units 2-L1 and 2-L2 of the sensor bar 1L and the sensor units 2-R1 and 2-R2 of the facing sensor bar 1R operate at different timings. With this arrangement, only retroreflected light of light emitted by the sensor unit itself can be detected without detecting infrared light of the sensor unit arranged on a facing side.

A signal which is output from the sensor unit 2 of the sensor bar 1 and represents a light receiving state will be explained with reference to FIGS. 4A to 4C. FIG. 4A shows an output from the light receiving unit 40 when the light projecting unit 30 of the sensor unit 2 does not emit light. FIG. 4B shows an output from the light receiving unit 40 when the light projecting unit 30 of the sensor unit 2 emits light. In FIG. 4B, a level A is the maximum level of a detected light amount, and a level B is a level at which no light is detected (received).

An infrared ray emitted by the sensor unit 2 is retroreflected by the retroreflecting member 4 arranged on a facing side, and detected by the sensor unit 2 itself. A light amount from a pixel number Nj to a pixel number Nf which define the effective pixel region of the line CCD 41 changes depending on the size and aspect ratio of the display screen, and a corresponding arrangement state of the sensor bars 1 (especially the distance between the two sensor bars 1).

When the user points on (touches) the input surface of the effective coordinate input region 5 and cuts off the optical path, no light amount can be detected at, for example, the pixel number Nc, as shown in FIG. 4C. In the first embodiment, a pointed direction, that is, angle is calculated by using signals in FIGS. 4A to 4C.

First, reference data is acquired at the time of activating the system, at the time of resetting the system, or automatically. Although data processing of one sensor unit 2 will be explained below, the remaining sensor units also perform the same processing.

Upon power-on, in a state in which the operator does not perform a touch operation (pointing operation) and the illumination by the light projecting unit 30 is OFF, the A/D converter 63 A/D-converts an output from the line CCD 41, and the memory 64 stores the value as Base_Data[N]. This data contains variations of the bias of the line CCD 41 and the like, and is data around the level B in FIG. 4A. [N] is the CCD pixel number of the line CCD 41, and a pixel number corresponding to an effective input range is used.

Similarly, a light amount distribution in a state in which the operator does not perform a touch operation and the light projecting unit 30 projects light is acquired and stored. This data is data indicated by a solid line in FIG. 4B, and is stored as Ref_Data[N] in the memory 64. The storage of these two types of data is managed as initial data.

After that, sampling starts. If no touch operation is performed, the data shown in FIG. 4B is detected. If a touch operation is performed, data shown in FIG. 4C in which a light shielding portion C has been detected in accordance with the pointed position is detected. The sample data obtained in a state in which the illumination by the light projecting unit 30 is ON is defined as Norm_Data[N].

The presence/absence of an input from the pointer and the presence/absence of a light shielding portion are determined by using these data (Base_Data[N] and Ref_Data[N] stored in the memory 64). First, to specify a light shielding portion, the absolute amount of a change of data is calculated in each pixel and compared with a preset threshold Vtha:

$$\text{Norm\_Data0}[N] = \text{Norm\_Data}[N] - \text{Ref\_Data}[N] \quad (1)$$

where Norm_Data0[N] is the absolute change amount in each pixel. By comparing the absolute change amount with the threshold, a determination error caused by noise or the like is prevented, and a reliable change of a predetermined amount is detected. If data exceeding the threshold is generated in, for example, a predetermined number or more of successive pixels, it is determined that a touch operation has been performed. Since this processing only calculates and compares a difference, the calculation can be executed within a short time and the presence/absence of an input can be determined quickly.

Then, the change ratio of pixel data is calculated, and an input point is determined by using equation (2):

$$\text{Norm\_Data}R[N] = \text{Norm\_Data0}[N]/(\text{Base\_Data}[N] - \text{Ref\_Data}[N]) \quad (2)$$

A separately set threshold Vthr is applied to this pixel data (light amount distribution). Then, the angle is calculated by setting, as a pixel corresponding to the input from the pointer, the center between pixel numbers at the leading and trailing edges, which correspond to points crossing the threshold Vthr, of a light amount variation region corresponding to the light shielding portion in the light amount distribution.

FIG. 4D exemplifies a detection result after the end of calculating the change ratio. Assume that in detection using the threshold Vthr, the leading edge of the light shielding portion reaches a level Ls in the Ns-th pixel and exceeds the threshold Vthr. Further, assume that the pixel data reaches a level Lt in the Nt-th pixel and becomes lower than the threshold Vthr.

At this time, calculation may be performed by setting, as the center value between pixel numbers at the leading edge and the trailing edge, the pixel number Np of the line CCD 41 that should be output, as represented by:

$$Np = Ns + (Nt - Ns)/2 \quad (3)$$

In this case, the pixel interval of the line CCD 41 becomes the resolution of the output pixel number.

For higher-resolution detection, a virtual pixel number at which the data level crosses the threshold Vthr may be calculated by using the data level of each pixel and that of an immediately preceding adjacent pixel.

Letting Ls be the level of the pixel Ns, Ls-1 be the level of the pixel Ns-1, Lt be that of the pixel Nt, and Lt-1 be that of the pixel Nt-1, virtual pixel numbers Nsv and Ntv can be calculated as:

$$Nsv = Ns - 1 + (Vthr - Ls - 1)/(Ls - Ls - 1) \quad (4)$$

$$Ntv = Nt - 1 + (Vthr - Lt - 1)/(Lt - Lt - 1) \quad (5)$$

According to these calculation equations, virtual pixel numbers corresponding to the output level, that is, pixel numbers finer than those of the line CCD 41 can be acquired. A virtual center pixel Npv between the virtual pixel numbers Nsv and Ntv is determined by equation (6):

$$Npv = Nsv + (Ntv - Nsv)/2 \quad (6)$$

In this fashion, higher-resolution detection can be implemented by calculating virtual pixel numbers at which the data level crosses the threshold Vthr of the predetermined level, from the pixel numbers of pixels of data levels exceeding the threshold Vthr, adjacent pixel numbers, and their data levels.

To calculate the actual coordinate value of the pointer from the obtained center pixel number, the center pixel number needs to be converted into angle information.

In actual coordinate calculation to be described later, it is more convenient to calculate not an angle itself but a tangent value at this angle. Note that a pixel number is converted into tanθ by using table lookup or a transformation. For example, when a high-order polynomial is used as the transformation, the accuracy can be ensured. However, it suffices to determine the order and the like in consideration of the calculation ability, accuracy specification, and the like.

The use of a fifth-order polynomial will be exemplified. First, the relationship between the pixel number of the sensor unit and the angle is measured at the time of assembling the apparatus. From the measurement result, coefficient data for converting a pixel number into tanθ are calculated based on the fifth-order polynomial. Then, the coefficient data are stored in the memory 64 (a non-volatile memory, or the like) in the apparatus. When the fifth-order polynomial is used, six coefficients are necessary, and these coefficient data are stored in a memory such as a nonvolatile memory at the time of shipment or the like. Letting L5, L4, L3, L2, L1, and L0 be the coefficients of the fifth-order polynomial, tanθ can be expressed by:

$$\tan\theta = ((((L5*Npv + L4)*Npv + L3)*Npv + L2)*Npv + L1)*Npv + L0 \quad (7)$$

By executing the same processing for the respective sensor units, respective angle data can be determined. Although tanθ is calculated in the above example, it is also possible to calculate angle data θ itself and then calculate tanθ.

Figure 5A:
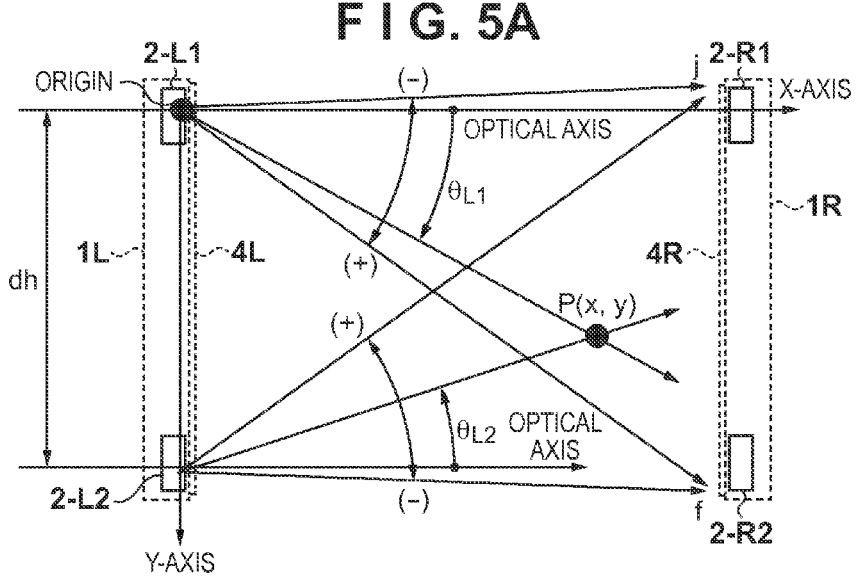
FIGS. 5A to 5F are views for explaining coordinate calculation according to the first embodiment.

FIGS. 5A to 5F are views showing a positional relationship with screen coordinates. The field range of the sensor unit 2-L1 of the sensor bar 1L is a range of the direction j to the direction f, and the sign of the angle is set as shown in FIG. 5A. The optical axis of the sensor unit 2-L1 is the X-axis direction, and its direction is defined as an angle of 0°. Similarly, the field range of the sensor unit 2-L2 is a range of the direction f to the direction j, the sign of the angle is set as shown in FIG. 5A, and the optical axis direction of the sensor unit 2-L2 is defined as an angle of 0°.

If a line segment connecting the center of the optical axis of the sensor unit 2-L1 and that of the optical axis of the sensor unit 2-L2 is defined as the Y-axis, the optical axis of each sensor unit becomes the normal direction of the line segment. Also, the distance between the center of the optical axis of the sensor unit 2-L1 and that of the optical axis of the sensor unit 2-L2 is defined as dh.

Assume that a touch operation is performed at the position of a point P.

An angle calculated by the sensor unit 2-L1 is θL1, and an angle calculated by the sensor unit 2-L2 is θL2. The coordinates of the pointed position P can be geometrically calculated by using these two pieces of angle information and the distance dh:

$$x = dh \cdot \tan(\pi/2 - \theta L2) \cdot \tan(\pi/2 - \theta L1)/(\tan(\pi/2 - \theta L2) + \tan(\pi/2 - \theta L1)) \quad (8)$$

$$y = dh \cdot \tan(\pi/2 - \theta L2)/(\tan(\pi/2 - \theta L2) + \tan(\pi/2 - \theta L1)) \quad (9)$$

Even if an output from one sensor unit is θL1=0 or θL2=0, the pointed position can be geometrically easily calculated based on angle information output from the other sensor unit.

In the above description, the distance dh between the two sensor units is known. Although the distance dh is known here to simplify the description, an arrangement capable of detecting a position in the case in which the distance dh is unknown will be described later.

Figure 5B:
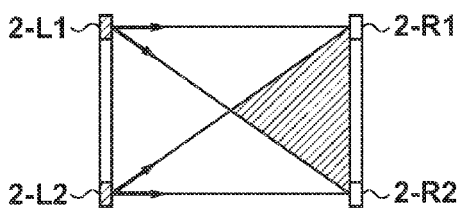
Figure 5E:
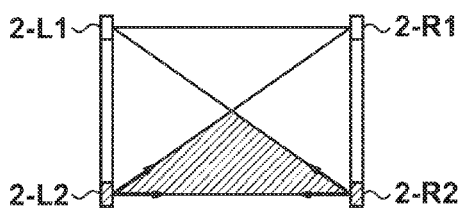
Figure 5C:
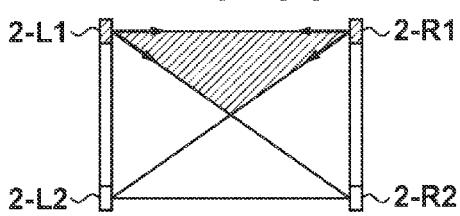

The pointed position can be calculated only when the pointed position P exists in a hatched range in FIG. 5B out of the field ranges of the sensor units 2-L1 and 2-L2. When the pointed position does not exist in this range, a combination of sensor units used for calculation is changed, as shown in FIGS. 5C, 5D, and 5E, and the pointed position in the entire effective coordinate input region 5 can be detected. Therefore, sensor units necessary for coordinate calculation are selected based on the presence/absence of a light shielding direction detected by each sensor unit 2 and the light shielding direction, and the pointed position is calculated. Then, the parameters in equations (8) and (9) are changed in accordance with a combination of the selected sensor units 2, and coordinate transformation is performed.

Figure 5F:
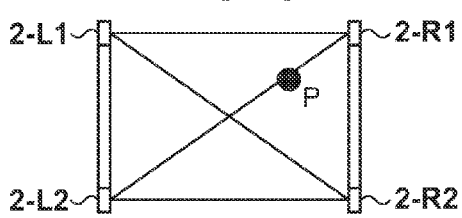
Figure 5D:
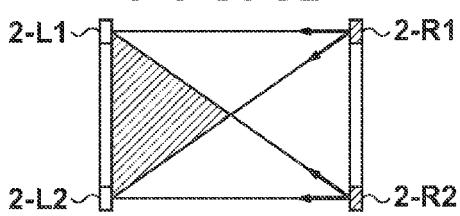

As shown in FIG. 5F, the pointed position P may exist near the boundary region in sensor unit selection. In this case, the pointed position can be calculated by a combination of sensor units in the state of FIG. 5B or 5C. As a practical arrangement, for example, the field range of the sensor unit 2-L2 and that of the sensor unit 2-R1 are configured to overlap each other in the diagonal direction of the effective coordinate input region 5. When the user touches the overlapping region, coordinates can be calculated by a plurality of combinations of the sensor units. In this case, the average value of coordinate values calculated by a combination of the sensor units may be output as determined coordinates.

Figure 6:
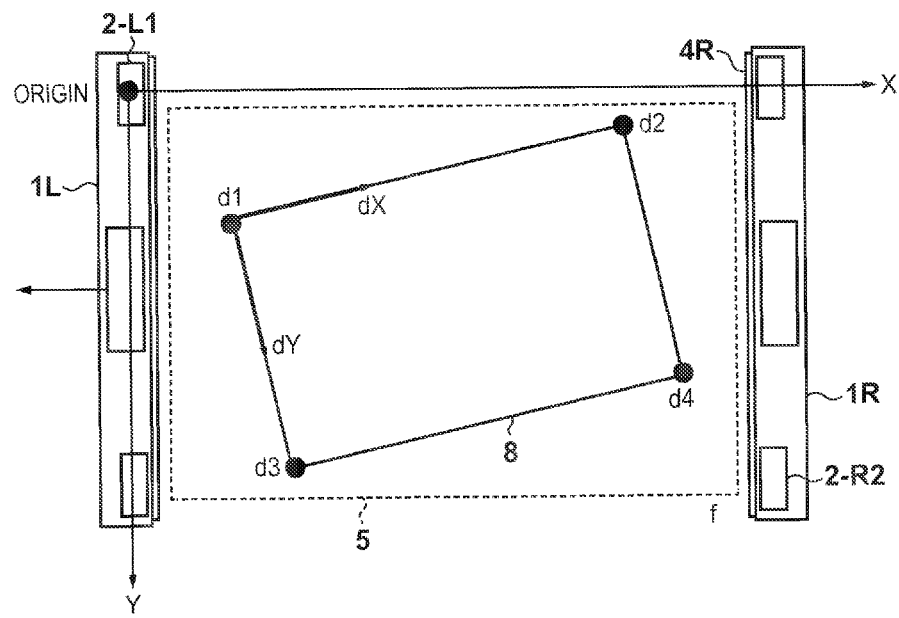
FIG. 6 is a view for explaining a relative coordinate system and a display coordinate system according to the first embodiment.

The calculated coordinate value is a value in the first coordinate system (to be referred to as the relative coordinate system of the coordinate input apparatus hereinafter) of the coordinate input apparatus according to the first embodiment. The effective region where position calculation is possible is the effective coordinate input region 5 in FIG. 1. The display surface of the display is set within the range of the effective coordinate input region 5. If the display is a front projector, a display region 8 serving as a projected image is set in the effective coordinate input region 5, as shown in FIG. 6. In FIG. 6, the display region is formed from the second coordinate system (to be referred to as a display coordinate system hereinafter) serving as a display coordinate system which has an origin dl and is defined by the dX axis and dY axis. To perform a tap operation on an icon or the like by directly touching a displayed image, the relative coordinate system and the display coordinate system need to be correlated.

To obtain this correlation, dedicated application software is generally installed in a personal computer (PC) which performs display control. When the application is activated, a cross or the like is displayed on the display screen to prompt the user to touch the cross position. The coordinate system is transformed so that a coordinate value in the relative coordinate system that is obtained by repeating this operation at different positions by a predetermined number of times, and a coordinate value in the display coordinate system at the position where the cross is displayed coincide with each other.

The coordinate input apparatus according to the first embodiment performs this coordinate transformation by prompting the user to touch the four corners of the display screen, instead of displaying a cross position by using the application software, and prompting the user to touch it. This arrangement has an effect in which the coordinate input apparatus can be quickly used by connecting it to an on-site PC without installing special software.

Transition to the mode in which these coordinate systems are made to coincide with each other is performed with, for example, a mode transition switch (not shown) provided to the sensor bar 1. Upon mode transition with the mode transition switch, an output unit such as a loudspeaker incorporated in the sensor bar 1 gives guidance to sequentially touch (point) the four corners. Every time the touch of the corner is completed, a buzzer sound may be output to notify the completion of the input. Alternatively, an indicator incorporated in the sensor bar 1 may prompt the operation.

In coordinate calculation in the relative coordinate system, the distance dh between the sensor units 2 used in calculation based on equations (8) and (9) is known. However, in a use form as shown in FIG. 6 in which the coordinate input apparatus is used in combination with the display apparatus, the distance dh need not be known in advance. More specifically, pieces of information of four corners representing a display size are sequentially acquired as pieces of angle information in the respective sensor units in the relative coordinate system by a touch operation. As a result, the coordinates of a pointed position in the display coordinate system can be calculated by ratio-based calculation.

In the above description, the two sensor bars 1L and 1R are parallel and have the same length. The first embodiment further adopts the second coordinate detection mode for higher user friendliness.

In the second coordinate detection mode, the sensor units 2-L1, 2-L2, 2-R1, and 2-R2 are driven so that the sensor units 2-L1 and 2-L2 of the sensor bar 1L directly detect infrared rays emitted by the infrared LEDs 31 of the sensor units 2-R1 and 2-R2 of the facing sensor bar 1R, as described in the U.S. patent application Ser. No. 13/973,651, filed Aug. 22, 2013, which is incorporated by reference. Similarly, the sensor units 2-L1, 2-L2, 2-R1, and 2-R2 are driven so that the sensor units 2-R1 and 2-R2 of the sensor bar 1R directly detect infrared rays emitted by the infrared LEDs 31 of the sensor units 2-L1 and 2-L2 of the facing sensor bar 1L.

Note that a coordinate detection mode in which the sensor units 2-L1 and 2-L2 of the sensor bar 1L and the sensor units 2-R1 and 2-R2 of the facing sensor bar 1R operate at different timings is the first detection mode.

Figure 7:
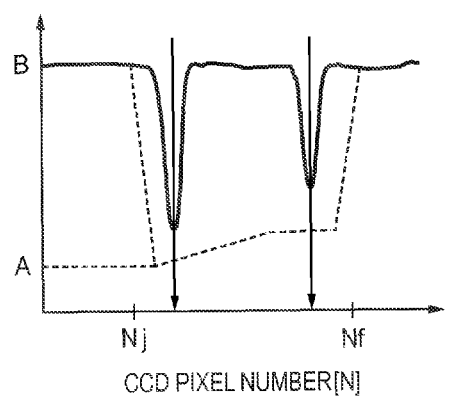
FIG. 7 is a graph for explaining the operation of the arithmetic control circuit in the second detection mode according to the first embodiment.

FIG. 7 shows a detection signal waveform obtained by the sensor unit 2 when the coordinate input apparatus operates in the second detection mode. Beams emitted by the light projecting units 30 of the two sensor units 2 arranged on facing sides are received, so two peak signals are generated. The respective directions are calculated by the same method as the above-described angle calculation method. In FIG. 7, a broken line indicates an output (light amount distribution) from the light receiving unit 40 shown in FIG. 4B, and represents that peak signals are generated between the direction Nj and the direction Nf which define the effective pixel region.

In this embodiment, even when the user attaches the two sensor bars 1 at a rough estimate, directions in which the facing sensor units 2 are positioned are detected in order to implement high-accuracy position detection. To detect the directions in which the facing sensor units 2 are positioned, each sensor unit 2 detects light from the light projecting unit 30 of the sensor unit 2 housed in the facing sensor bar 1.

This state will be explained with reference to FIG. 8A.

Figure 8A:
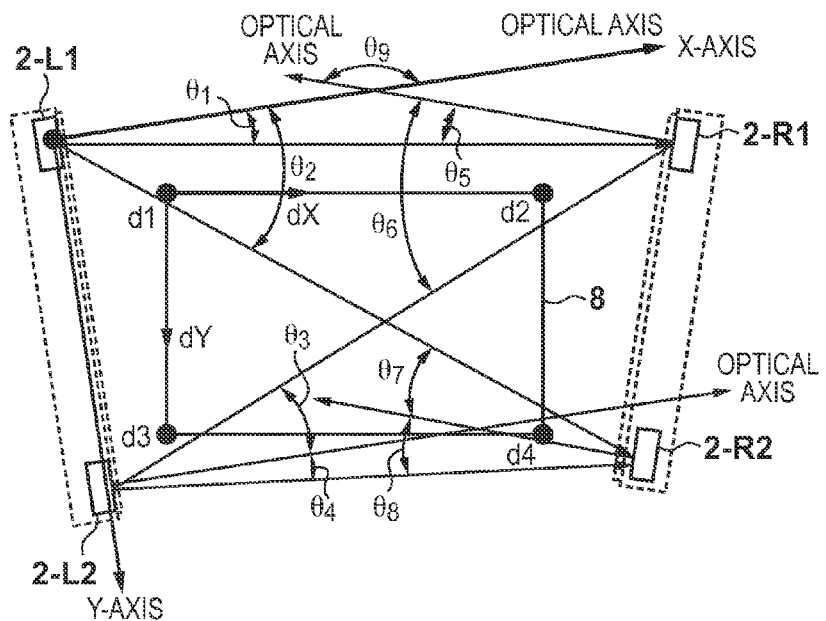
FIGS. 8A and 8B are views for explaining calculation of the relative positional relationship between the sensor units according to the first embodiment.

In FIG. 8A, a line segment connecting the center of the optical axis of the sensor unit 2-L1 and that of the optical axis of the sensor unit 2-L2 is defined as the Y-axis, and the normal direction is defined as the X-axis. The optical axes of the sensor units 2-L1 and 2-L2 are parallel to the X-axis. The facing sensor unit 2-R1 is positioned in a direction at an angle θ1 when viewed from the sensor unit 2-L1, and a direction at an angle θ3 when viewed from the sensor unit 2-L2. Similarly, angles from θ1 to θ8 can be calculated. As a result, an angle θ9 formed by the optical axis of the sensor unit 2-L1 of the sensor bar 1L and that of the sensor unit 2-R1 of the sensor bar 1R is calculated.

In other words, the relative inclinations of the sensor bars 1L and 1R can be detected. Further, even when the length of the sensor bar 1 in the longitudinal direction changes, the relative positional relationship between the four sensor units can be acquired though the distance between the sensor units 2 cannot be obtained. If the above-mentioned pieces of information of four corners representing a display size are acquired by a touch operation, coordinates in the display coordinate system can be calculated at high accuracy only by relative coordinate calculation.

FIG. 9 is a flowchart showing initial setting processing after power-on. The initial setting processing is implemented when the CPU 61 serving as a computer executes, for example, a program read out from the memory 64.

To form the rectangular effective coordinate input region 5 containing the entire display region 8 serving as a projected image, the operator attaches the sensor bars 1 to the whiteboard 6. For example, the sensor bars 1 incorporate magnets so that the sensor bars 1 can be stuck to the whiteboard 6. After power-on, the CPU 61 starts initial setting processing (step S101).

Then, the CPU 61 performs various initialization processes regarding the coordinate input apparatus such as the I/O port setting and timer setting. In addition, the CPU 61 initializes the line CCD 41 to, for example, remove unwanted charges remaining in the photoelectric converter (step S102).

Thereafter, a light amount to be detected by the line CCD 41 is optimized. As described above, the sizes of the whiteboard 6 and display region 8 vary depending on the use environment, and the user appropriately sets the distance between the sensor bars 1. Hence, the intensity of detected light changes depending on the state of attachment. For this reason, operation setting is performed to set the shutter open time of the line CCD 41, the ON time of the infrared LED 31, the driving current of the infrared LED 31, or the like to a predetermined initial value (step S103). The operation setting is the state (second detection mode) of an operation of directly receiving light from the facing sensor unit 2. The relative positional relationship between the four sensor units 2 is derived.

An output signal from the line CCD 41 is received (step S104). Whether light has been detected is determined by checking the arrangement of the sensor units (step S105). if no light has been detected (NO in step S105), the sensor unit 2 at a facing position may not fall within the field range of the light receiving unit 40 of the sensor unit 2. In this case, the arrangement/setting of the sensor bars 1 by the user is improper, and the user is notified of a message indicative of this to prompt him to set the sensor bars again (step S106). Upon completion of re-setting by the user, step S101 starts again. Note that signals detected in steps S105 and S106 are ones as shown in FIG. 7. In the first embodiment, a state in which two signals are output is a normal state.

If light has been detected (YES in step S105), the waveform of the detection signal is checked (step S107). If light from the sensor unit 2 at a facing position is excessively strong, for example, if at least part of the waveform (waveform level) of the detection signal exceeds a predetermined threshold (NO in step S107), the process returns to step S103, and settings are made again to, for example, shorten the exposure time. A detection signal waveform to be checked in step S107 next time should exhibit a lower light intensity. If the signal level is proper (YES in step S107), for example, if at least part of the detection signal waveform is equal to or lower than the predetermined threshold, the process advances to step S108.

This operation is executed in the respective sensor units (four sensor units in the first embodiment). After optimizing all signals, positional relationship calculation processing is executed to calculate the relative positional relationship between the sensor units 2 (step S108).

An example of a method of calculating the position of each sensor unit in step S108 will be described below. First, as described above, θ1 to θ7 shown in FIG. 8A are calculated based on the waveforms of detection signals obtained by the respective sensor units. Note that θ8 is not used in processing according to the first embodiment and thus is not calculated.

Figure 8B:
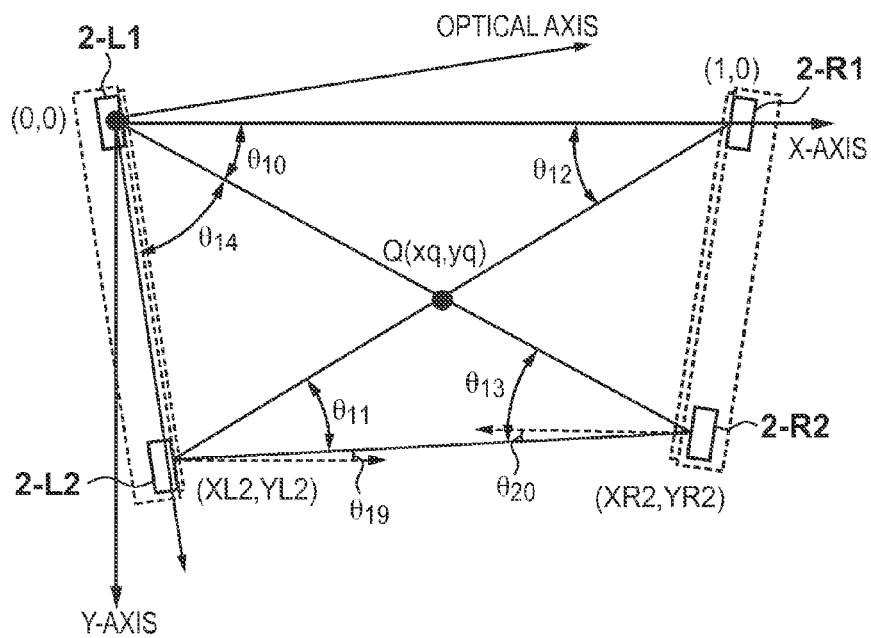

Then, as shown in FIG. 8B, the sensor unit 2-L1 is set as an origin, a direction in which the origin and the sensor unit 2-R1 are connected is defined as the X-axis, and a direction perpendicular to the X-axis is defined as the Y-axis. A relative coordinate system is defined by setting the coordinates (X, Y) of the sensor unit 2-R1 to be a value (1, 0).

After that, θ10 to θ12 shown in FIG. 8B are calculated from the θ1 to θ6 values:

$$\theta 10 = \theta 2 - \theta 1 \tag{10}$$

$$\theta 11 = \theta 3 + \theta 4 \tag{11}$$

$$\theta 12 = \theta 6 - \theta 5 \tag{12}$$

θ13 is not used in processing according to the first embodiment and thus is not calculated. Another method for calculating each angle will be exemplified.

The following equation is established from FIG. 8B:

$$\theta 10 + \theta 12 = \theta 11 + \theta 13 \tag{13}$$

From equation (13), if any three of θ10 to θ13 are known, the remaining one angle can be calculated. It is therefore possible to calculate three arbitrary angles out of θ10 to θ13, and calculate the remaining one angle according to equation (13). For example, there is a method of calculating θ10, θ12, and θ13 and then calculating θ11 according to equation (13).

As described with reference to FIG. 8A, the angle defined by the optical axis of the sensor unit 2-L1, and the line segment connecting the center of the optical axis of the sensor unit 2-L1 and that of the optical axis of the sensor unit 2-L2 is designed to be π/2 [rad]. This value is stored as reference angle information in the memory 64 (reference angle information storage unit). The storage of the reference angle information is executed by work of measuring a reference angle and storing it in the memory 64 at the time of, for example, assembling the apparatus in the factory. By using this reference angle information, θ14 is calculated:

$$\theta 14 = \pi/2 - \theta 2 \tag{14}$$

By using θ10 to θ14, the coordinates of the sensor units 2-L2 and 2-R2 are calculated. Letting (XL2, YL2) be the coordinates of the sensor unit 2-L2, and (XR2, YR2) be the coordinates of the sensor unit 2-R2, the following equations are established from FIG. 8B:

$$YL2 = XL2 \times \tan(\theta 10 + \theta 14) \tag{15}$$

$$YL2 = (1 - XL2) \times \tan \theta 12 \tag{16}$$

$$YR2 = XR2 \times \tan\theta 10 \tag{17}$$

$$YR2 - YL2 = (XR2 - XL2) \times \tan(\theta 11 - \theta 12) \tag{18}$$

From equations (15) and (16), $$XL2 = \tan\theta 12/(\tan(\theta 10 + \theta 14) + \tan\theta 12) \tag{19}$$

Also, from equations (17) and (18), $$XR2 = (YL2 - XL2 \times \tan(\theta 11 - \theta 12))/(\tan\theta 10 - \tan(\theta 11 - \theta 12)) \tag{20}$$

From equation (19), XL2 is calculated. YL2 is calculated from the calculated coordinate XL2 and equation (15).

Thereafter, XR2 is calculated from the calculated coordinates XL2 and YL2 and equation (20). YR2 is calculated from the calculated coordinate XR2 and equation (17).

By the above-described procedures, the coordinates (XL2, YL2) of the sensor unit 2-L2 and the coordinates (XR2, YR2) of the sensor unit 2-R2 are calculated. The calculated coordinates (XL2, YL2) of the sensor unit 2-L2 and the calculated coordinates (XR2, YR2) of the sensor unit 2-R2 are stored in the memory 64. Note that the above-described coordinate value processing method for each sensor unit is an example, and the coordinate value may also be calculated by other equations and procedures.

Error factors of the apparatus will be explained. First, light detected by the line CCD 41 is quantized for each pixel, so a quantization error is generated. When converting a pixel number detected by the line CCD 41 into an angle, the conversion is performed by table lookup or polynomial approximation. At this time, an error is generated. The above-mentioned reference angle information is measured at the time of, for example, assembling the apparatus in the factory. At this time, a measurement error is generated. Further, if the position shifts owing to aged deterioration or the like, an error may be further generated.

Owing to some of these error factors, an error is generated between the position of a touch input and a calculated coordinate value, and the position of the touch input and the calculated coordinate value do not coincide with each other. Coordinate calculation is performed separately in four regions based on a combination of the sensor units, as described with reference to FIG. 5, and the error differs between the regions. This causes the problem that coordinate values do not coincide with each other at the boundary between the regions. For example, when a line is drawn, the line becomes discontinuous at the boundary between regions.

In steps S109 and S110, processing of calculating a correction value for correcting a coordinate value calculated in each region is performed, in order to reduce the inconsistency between coordinate values at the boundary between regions. This processing will be explained.

As is apparent from FIG. 8B, letting Q be the intersection of line segments connecting the sensor units which mutually detect light beams from the light projecting units, an angle at which the point Q is positioned is detected from all the sensor units. By mutually detecting light beams from the light projecting units, these light beams can be detected as if light were emitted at the point Q. Hence, the coordinate value of the point Q can be calculated in each of the four regions based on a combination of a plurality of sensor units. The point Q said to be the coordinates of a light shielding portion can be regarded as a coordinate measurement point common to the four regions. This coordinate measurement point calculation processing (step S109) will be described.

From FIG. 8B, the following relation is established between an angle detected by the sensor unit 2-L1 and the coordinates (xq, yq) of the point Q:

$$yq = xq \times \tan\theta 10 \tag{21}$$

Similarly, the following relation is established between an angle detected by the sensor unit 2-R1 and the coordinates (xq, yq) of the point Q:

$$yq = (1 - xq) \times \tan\theta 12 \tag{22}$$

Similarly, the following relation is established between an angle detected by the sensor unit 2-L2 and the coordinates (xq, yq) of the point Q:

$$YL2 - yq = (xq - XL2) \times \tan(\theta 11 + \theta 19) \tag{23}$$

Similarly, the following relation is established between an angle detected by the sensor unit 2-R2 and the coordinates (xq, yq) of the point Q:

$$YR2 - yq = (XR2 - xq) \times \tan(\theta 13 + \theta 20) \tag{24}$$

θ19 and θ20 are angles defined by a line connecting the sensor units 2-L2 and 2-R2, and lines parallel to the X-axis. For example, θ19 and θ20 can be calculated as follows from FIG. 8B:

$$\theta 19 = \theta 12 - \theta 11 \tag{25}$$

$$\theta 20 = -\theta 19 \tag{26}$$

The coordinate value of the point Q is calculated in each of the four regions in FIGS. 5A to 5F by using a corresponding sensor unit relation among equations (21) to (24).

First, in the region of FIG. 5B, xq is calculated from equation (21) established for the sensor unit 2-L1 and equation (23) established for the sensor unit 2-L2:

$$xq = (YL2 + XL2 \times \tan(\theta 11 + \theta 19))/(\tan\theta 10 + \tan(\theta 11 + \theta 19)) \tag{27}$$

Then, yq is calculated from the calculated coordinate xq and equation (21).

Next, in the region of FIG. 5C, xq is calculated from equation (21) established for the sensor unit 2-L1 and equation (22) established for the sensor unit 2-R1:

$$xq = \tan\theta 12/(\tan\theta 10 + \tan\theta 12) \tag{28}$$

Then, yq is calculated from the calculated coordinate xq and equation (21).

Similarly, in the region of FIG. 5D, xq is calculated from equation (22) established for the sensor unit 2-R1 and equation (24) established for the sensor unit 2-R2:

$$xq = (\tan\theta 12 + XR2 \times \tan(\theta 13 + \theta 20) - YR2)/(\tan\theta 12 + \tan(\theta 13 + \theta 20)) \tag{29}$$

Then, yq is calculated from the calculated coordinate xq and equation (22).

Similarly, in the region of FIG. 5E, xq is calculated from equation (23) established for the sensor unit 2-L2 and equation (24) established for the sensor unit 2-R2:

$$xq = (XL2 \times \tan(\theta 11 + \theta 19) + XR2 \times \tan(\theta 13 + \theta 20) + YL2 - YR2)/(\tan(\theta 11 + \theta 19) + \tan(\theta 13 + \theta 20)) \tag{30}$$

Then, yq is calculated from the calculated coordinate xq and equation (23).

In this way, a plurality of coordinate values (xq, yq) of the point Q are calculated for four combinations of the sensor units. (xqb, yqb), (xqc, yqc), (xqd, yqd), and (xqe, yqe) represent the respective coordinate values of the point Q calculated in the respective regions of FIGS. 5B, 5C, 5D, and 5E. However, these four coordinate values do not coincide with each other owing to several error factors of the apparatus, as described above.

Therefore, offset correction values for making these four coordinate values coincide with each other are calculated (step S110). First, the average value of the four coordinate values is calculated. Letting xave and yave be the average values of x-coordinates and y-coordinates, respectively:

$$xave=(xqb+xqc+xqd+xqe)/4 \quad (31)$$

$$yave=(yqb+yqc+yqd+yqe)/4 \quad (32)$$

Then, offset correction values in the respective regions are calculated. ofxb, ofxc, ofxd, and ofxe are offset correction values in the x direction in the respective regions of FIGS. 5B, 5C, 5D, and 5E. Similarly, ofyb, ofyc, ofyd, and ofye are offset correction values in the y direction. The correction values are calculated as follows. Note that the calculated correction values are stored in the memory 64.

$$ofxb=xave-xqb \quad (33)$$

$$ofxc=xave-xqc \quad (34)$$

$$ofxd=xave-xqd \quad (35)$$

$$ofxe=xave-xqe \quad (36)$$

$$ofyb=yave-yqb \quad (37)$$

$$ofyc=yave-yqc \quad (38)$$

$$ofyd=yave-yqd \quad (39)$$

$$ofye=yave-yqe \quad (40)$$

Note that the correction value calculation method is not limited to this as long as the difference between the plurality of coordinate values is reduced even if a plurality of coordinate values do not completely coincide with each other.

In step S111 and subsequent steps, infrared light projected by the sensor unit 2 is retroreflected by the retroreflecting member 4 attached to the facing sensor bar 1, the retroreflected light is detected by the light receiving unit 40 of the sensor unit 2 itself, and the signal level at this time is optimized. As described above, the arrangement of the sensor bars 1 is not constant, and a detection level corresponding to the arrangement is optimized to obtain a stable signal. An item to be set includes the shutter open time of the line CCD 41, the ON time of the infrared LED 31, or the driving current of the infrared LED 31. In this case, operation settings are made in the first detection mode (step S111).

If the initial operation settings are made in step S111 to obtain a maximum light amount, an output signal from the line CCD 41 at this time is received (step S112).

The received output signal is data at the time of illumination and has a waveform as shown in FIG. 4B. If light is excessively strong, it exceeds the dynamic range of the line CCD 41, the output is saturated, and it becomes difficult to calculate an accurate angle. In this case, it is determined in step S113 that the waveform of the detection signal is improper (NO in step S113), the process returns to step S111, and settings are made again to reduce the waveform (waveform level) of the detection signal. Since retroreflected light is detected, it is set to greatly increase the amount of light to be projected, compared to a case in which the light receiving unit 40 directly detects light projected by the sensor unit 2 in the processes of steps S103 to S107 (that is, the second detection mode).

If it is determined in step S113 that the waveform level is optimum (YES in step S113), a signal Base_Data[N] (see FIG. 4A) in the absence of illumination is acquired and stored in the memory 64 (step S114). Then, a signal Ref_Data[N] (see FIG. 4B) in the presence of illumination is acquired and stored in the memory 64 (step S115).

After acquiring data in all the sensor units, a series of initial setting processes is completed.

FIG. 10A is a flowchart showing a normal sampling operation after initial setting processing. This sampling operation is implemented when the CPU 61 serving as a computer executes, for example, a program read out from the memory 64.

The initial setting processing in FIG. 9 is executed (step S101). As a normal reception operation (first detection mode), a signal obtained when infrared light projected by the sensor unit 2 is retroreflected by the retroreflecting member 4 provided to the facing sensor bar 1 and the retroreflected light is detected by the light receiving unit 40 of the sensor unit 2 itself is detected (step S201). The data at this time is Norm_data[N]. If a touch operation is performed and cuts off the optical path, no optical signal can be detected near the pixel number Nc, as shown in FIG. 4C.

Whether any sensor unit 2 has generated such a light shielding portion, that is, the presence/absence of an input is determined (step S202). If it is determined that there is no input (NO in step S202), the process returns again to step S201 to repeat sampling. If it is determined that there is an input (YES in step S202), sensor units which have generated the light shielding portion in the output signal are selected (step S203). By using the selected sensor units, the direction (angle) in which the light shielding portion has been generated are calculated (step S204).

Figure 11A:
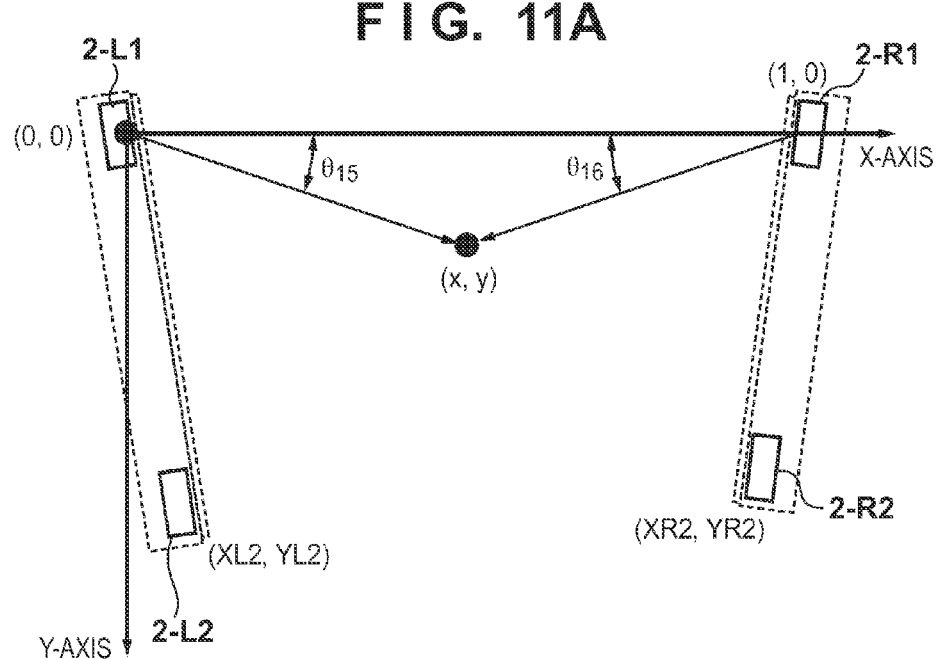
FIGS. 11A and 11B are views for explaining calculation of the relative positional relationship between the sensor units according to the first embodiment.
Figure 11B:
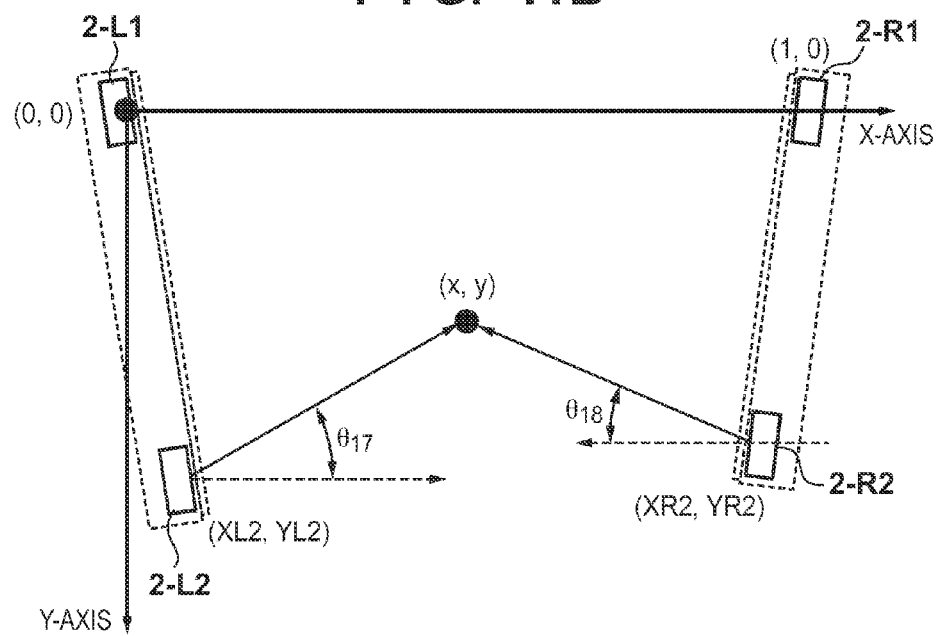

FIGS. 11A and 11B show examples when a light shielding portion (shadow) is generated by pointing.

FIG. 11A shows a case in which a light shielding portion is generated in the region of FIG. 5C. θ15 is the angle of the light shielding portion detected by the sensor unit 2-L1. θ16 is the angle of the light shielding portion detected by the sensor unit 2-R1. Similarly, FIG. 11B shows a case in which a light shielding portion is generated in the region of FIG. 5E. θ17 is the angle of the light shielding portion detected by the sensor unit 2-L2. θ18 is the angle of the light shielding portion detected by the sensor unit 2-R2. θ17 and θ18 are angles when directions (directions indicated by dotted lines) parallel to the respective sensor units along the X-axis are set as a reference.

The direction parallel to the sensor unit 2-L2 along the X-axis is calculated as a direction (angle) obtained by rotating by θ12 a direction in which the sensor unit 2-R1 is detected from the sensor unit 2-L2 when calculating the relative coordinates of each sensor unit. As for the sensor unit 2-R2, a direction parallel along the X-axis is similarly calculated as a direction (angle) obtained by rotating by θ10 a direction in which the sensor unit 2-L1 is detected from the sensor unit 2-R2.

Based on the calculated angles, the coordinates of the pointed position in the relative coordinate system are calculated (step S205). More specifically, the coordinates are calculated as follows.

From FIG. 11A, the following relation is established between the angle detected by the sensor unit 2-L1 and the coordinates (x, y) of the light shielding portion:

$$y=x \times \tan \theta 15 \quad (41)$$

Similarly, the following relation is established between the angle detected by the sensor unit 2-R1 and the coordinates of the light shielding portion:

$$y=(1-x) \times \tan \theta 16 \quad (42)$$

Similarly, from FIG. 11B, the following relation is established between the angle detected by the sensor unit 2-L2 and the coordinates of the light shielding portion:

$$YL2-y=(x-XL2)\times\tan\theta17 \quad (43)$$

Similarly, the following relation is established between the angle detected by the sensor unit 2-R2 and the coordinates of the light shielding portion:

$$YR2-y=(XR2-x)\times\tan\theta18 \quad (44)$$

The combination of sensor units which detect a light shielding portion differs between the four regions, as described with reference to FIG. 5.

In the region of FIG. 5B, the sensor units 2-L1 and 2-L2 detect the light shielding portion. x is calculated from equation (41) established for the sensor unit 2-L1 and equation (43) established for the sensor unit 2-L2:

$$x=(YL2+XL2\times\tan\theta17)/(\tan\theta15+\tan\theta17) \quad (45)$$

y is calculated from the calculated coordinate x and equation (41). Note that YL2 and XL2 have been calculated in step S108 and stored in the memory 64.

In the region of FIG. 5C, the sensor units 2-L1 and 2-R1 detect the light shielding portion. x is calculated from equation (41) established for the sensor unit 2-L1 and equation (42) established for the sensor unit 2-R1:

$$x=\tan\theta16/(\tan\theta15+\tan\theta16) \quad (46)$$

y is calculated from the calculated coordinate x and equation (41).

Similarly in the region of FIG. 5D, x is calculated from equation (42) established for the sensor unit 2-R1 and equation (44) established for the sensor unit 2-R2:

$$x=(\tan\theta16+XR2\times\tan\theta18-YR2)/(\tan\theta16+\tan\theta18) \quad (47)$$

y is calculated from the calculated coordinate x and equation (42).

Similarly, in the region of FIG. 5E, x is calculated from equation (43) established for the sensor unit 2-L2 and equation (44) established for the sensor unit 2-R2:

$$x=(XL2\times\tan\theta17+XR2\times\tan\theta18+YL2-YR2)/(\tan\theta17+\tan\theta18) \quad (48)$$

y is calculated from the calculated coordinate x and equation (43).

By the above-described processing, the relative coordinate value (x, y) of the pointed position is calculated. As described above, owing to the error factors of the apparatus, coordinate values respectively calculated in two regions sandwiching the boundary do not coincide with each other at the boundary between the regions, and become discontinuity at the boundary. To reduce this discontinuity, the coordinate value is corrected (step S206).

First, (xb, yb), (xc, yc), (xd, yd), and (xe, ye) are defined as coordinate values calculated in the respective regions of FIGS. 5B, 5C, 5D, and 5E, respectively. Then, (xb', yb'), (xc', yc'), (xd', yd'), and (xe', ye') are defined as corrected coordinate values, respectively. Offset correction is performed as follows. Note that the offset correction values ofxb, ofxc, ofxd, ofxe, ofyb, ofyc, ofyd, and ofye have been calculated in step S110 and stored in the memory 64.

$$xb'=xb+ofxb \quad (49)$$

$$xc'=xc+ofxc \quad (50)$$

$$xd'=xd+ofxd \quad (51)$$

$$xe'=xe+ofxe \quad (52)$$

$$yb'=yb+ofyb \quad (53)$$

$$yc'=yc+ofyc \quad (54)$$

$$yd'=yd+ofyd \quad (55)$$

$$ye'=ye+ofye \quad (56)$$

This coordinate correction calculation makes coordinate values calculated in the four regions coincide with each other at the point Q in FIG. 8B, reducing the discontinuity of the coordinates.

The calculated coordinates of the pointed position are transformed into coordinates in the display coordinate system, and the coordinate value is output (transmitted) to the external device such as a personal computer (step S207).

At this time, a touch-down signal/touch-up signal representing whether the input surface remains touched may be output together. In a coordinate input apparatus of this type, the optical path is completely cut off by touching the touch surface. However, when the touch state is gradually canceled, light passes gradually. Thus, by calculating the degree at which light is cut off, whether the touch surface remains touched, or the touch surface is not touched but the optical path is cut off (angle calculation is possible, and even in this case, the position can be calculated) can be determined by setting a threshold.

Note that the above-described coordinate correction processing can be similarly executed even in a system in which the setting position is fixed, as shown in FIG. 1. That is, even in the system in which the setting position is fixed, coordinate correction can be similarly performed by executing the second detection mode, calculating the coordinates of a common coordinate measurement point, and calculating correction values for respective regions.

The switching unit (a switch, or the like) is operated to shift to the calibration mode (second detection mode) in which the relative coordinate system and the display coordinate system are made to coincide with each other. A sequence in the calibration mode will be explained with reference to FIG. 10B. This calibration is implemented when the CPU 61 serving as a computer executes, for example, a program read out from the memory 64.

The calibration mode is performed immediately after the sensor bars 1 are attached, or when the display position of the display changes accidentally even upon completion of the setting. After the transition to the calibration mode, initial setting processing is performed (step S101). In this case, an optical output is optimized and misalignment of the sensors is corrected on the assumption that the setting state of the sensor bars changes during use.

To prompt the user to perform a touch operation at the four corners of the display region 8, it is determined through steps S201 and S202 whether the user has touched one of these positions. In step S203 and S204, necessary angle information is calculated. Thereafter, the user is notified of the completion of data acquisition (step S301). As this notification, for example, a beep may be output to represent the completion.

Then, it is determined whether acquisition of information about all the four corners of the display region 8 is completed (step S302). If the acquisition is not completed (NO in step S302), the process returns to step S201. If the acquisition is completed (YES in step S302), parameters for transformation from the relative coordinate system into the display coordinate system are calculated (step S303). The calculated parameters are stored in the memory 64. The process then returns to the normal operation. The calculated parameters are used in coordinate transformation in step S207.

Here, the effective coordinate input region 5 where a touch is validated is determined in advance, as shown in FIG. 1. This is because the values θ15 to θ18 in FIG. 11 become close to 0 at portions outside above and below the effective coordinate input region 5, and the error of calculated coordinates increases. The range of the effective coordinate input region 5 is determined in consideration of the tolerance of the error.

The above-described calibration processing can associate the position of the display screen with the setting position of the apparatus. At this time, it can be checked whether the display screen falls within the effective range of the apparatus. For example, if it is determined that the display screen falls outside the effective range as a result of checking the effective range, processing of notifying the user by a beep, sound, or the like to adjust again the display screen may be performed.

Alternatively, driver software for performing screen adjustment may be operated in advance in a connected PC. According to this method, when it is determined that the display screen falls outside the effective range by calibration processing, information representing the shift amount of the display screen from the effective range is transmitted to the driver software. The driver software receives the information and can automatically adjust the display screen.

As described above, the first embodiment provides a coordinate input apparatus which reduces the discontinuity of coordinates at the boundary between regions.

In the first embodiment, the angle defined by the optical axis of the sensor unit 2-L1, and the line segment connecting the center of the optical axis of the sensor unit 2-L1 and that of the optical axis of the sensor unit 2-L2 is fixed at $\pi/2$ [rad], as described with reference to FIG. 8A. This value is stored as reference angle information, and θ14 in FIG. 8B is calculated by using the reference angle information, as represented by equation (14).

The second embodiment will explain an example of performing processing without reference angle information. In the second embodiment, it is designed so that a light receiving unit 40 in a sensor unit 2-L1 can receive light emitted by an infrared LED 31 in a sensor unit 2-L2 in FIG. 8B. That is, as for the light projecting unit 30 of the sensor unit 2-L2 and the light receiving unit 40 of the sensor unit 2-L1, the designs of the field of view and other optical systems are changed from those in the first embodiment. Also, a housing is designed to ensure an optical path extending from the sensor unit 2-L2 to the sensor unit 2-L1 inside the housing.

A processing sequence is the same as that in the first embodiment. When receiving a waveform in step S104 of FIG. 9, the light receiving unit 40 in the sensor unit 2-L1 receives light emitted by the infrared LED 31 in the sensor unit 2-L2, and the direction of the sensor unit 2-L2 is detected from the sensor unit 2-L1. θ14 in FIG. 8B can be calculated based on the detected direction. The subsequent processing sequence is the same as that in the first embodiment, and a description thereof will not be repeated.

As described above, according to the second embodiment, no reference angle information need be stored in advance, and work of measuring and storing a reference angle can be omitted, in addition to the effects described in the first embodiment.

In the first and second embodiments, the coordinate input apparatus is constituted by the two sensor bars 1 each incorporating the two sensor units 2. However, the coordinate input apparatus is not limited to this. For example, the sensor units 2 and the retroreflecting members 4 may be separate.

Figure 12:
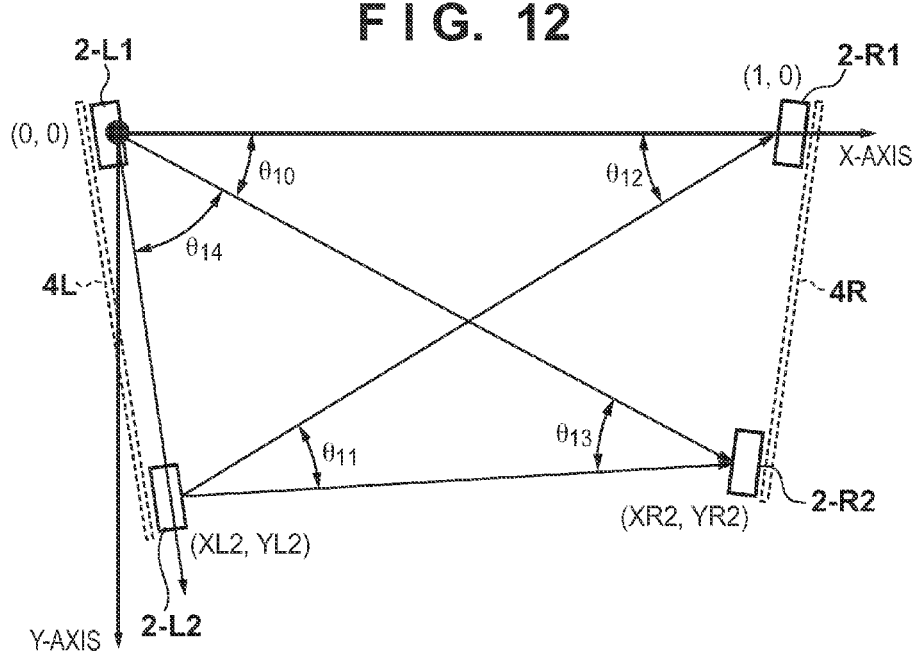
FIG. 12 is a view showing the schematic arrangement of a coordinate input apparatus according to the third embodiment.

As shown in FIG. 12, the four sensor units 2-L1, 2-L2, 2-R1, and 2-R2 are set around the effective coordinate input region 5, and the retroreflecting members 4L and 4R each are set to be positioned between the sensor units. The principle described in the first embodiment is applicable to even this apparatus arrangement. Note that a processing sequence is the same as that in the first embodiment, and a description thereof will not be repeated.

Figure 13:
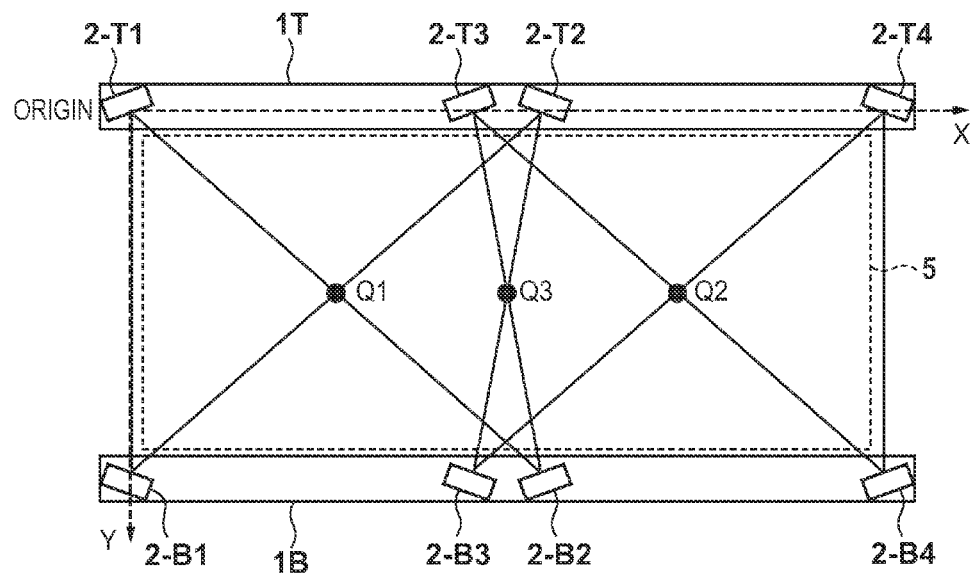
FIG. 13 is a view showing the schematic arrangement of a coordinate input apparatus according to the fourth embodiment.

An example in which eight sensor units are used to cope with a horizontally long screen will be described as the fourth embodiment. As shown in FIG. 13, a sensor bar 1T is set at the top of an effective coordinate input region 5, and a sensor bar 1B is set at the bottom of the effective coordinate input region 5. The sensor bars 1T and 1B incorporate four sensor units 2-T1 to 2-T4 and four sensor units 2-B1 to 2-B4, respectively. In this form, the sensor bars shown in FIG. 1 are arranged not on the left and right sides of the effective coordinate input region 5 but the top and bottom of the effective coordinate input region 5, and these two sensor bars are combined.

As shown in FIG. 13, a coordinate system is set by using the sensor unit 2-T1 as an origin. Coordinate calculation of the left half region of the effective coordinate input region 5 is performed by using the four sensor units 2-T1, 2-T2, 2-B1, and 2-B2. Similarly, coordinate calculation of the right half region of the effective coordinate input region 5 is performed by using the four sensor units 2-T3, 2-T4, 2-B3, and 2-B4.

In this arrangement, as for the left region, coordinate values in four regions can be corrected by using a common coordinate measurement point Q1 present in the left region, as described in the first embodiment. Similarly, as for the right region, coordinate values in four regions can be corrected by using a common coordinate measurement point Q2 present in the right region.

In FIG. 13, a common coordinate measurement point Q3 further exists for a combination of the sensor units 2-T2 and 2-B2 and a combination of the sensor units 2-T3 and 2-B3. That is, the coordinate values of the point Q3 can be calculated by the combination of the sensor units 2-T2 and 2-B2 and the combination of the sensor units 2-T3 and 2-B3. Correcting these two coordinate values can reduce the discontinuity of coordinates generated between the left half region and right half region of the effective coordinate input region 5.

In the above-described embodiments, the sensor unit is constituted so that the light projecting unit incorporates the infrared LED, and the light receiving unit incorporates the line CCD sensor and the like. As another form, each of the above-described embodiments is applicable to even a system using an image capturing apparatus (camera).

In this case, in the example of FIG. 8B, the sensor units 2-L1, 2-L2, 2-R1, and 2-R2 incorporate image capturing apparatuses. Each image capturing apparatus captures an image in the direction of the display region 8, and performs image recognition processing such as matching to detect an angle at which another image capturing apparatus is positioned. By using the mutually detected angles, the coordinates of the common coordinate measurement point Q can be calculated as in the first embodiment.

Note that touch detection in the camera system is achieved by a method of detecting an input by a finger or the like by image recognition processing, or a method using a pen. In the method using a pen, for example, an LED is incorporated in the pen tip and caused to emit light at the time of touching, and the camera detects the light, thereby detecting the direction of the input.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261840, filed Dec. 18, 2013, which is hereby incorporated by reference herein in its entirety.

What is claimed is:

1. A coordinate input apparatus which detects a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave, comprising: a input unit configured to input a plurality of directions corresponding to a common position detected by the at least four sensor units; a calculation unit configured to calculate correction data based on the plurality of directions corresponding to the common position detected by the at least four sensor units: and a storage unit configured to store the correction data in a memory unit, wherein the calculation unit is configured to calculate the pointed position based on the detection outputs from two sensor units corresponding to the pointed position, and on the correction data stored in the memory unit.

2. The apparatus according to claim 1, wherein the storage unit stores, in the memory unit, the correction data based on directions of remaining sensor units by using one of the four sensor units as a reference, and respective detection outputs of a plurality of combinations for the common position.

3. The apparatus according to claim 1, wherein the storage unit stores, in the memory unit, the correction data based on respective detection outputs of the plurality of combinations for the common position corresponding to an intersection of line segments connecting the at least four sensor units.

4. The apparatus according to claim 1, wherein the calculation unit calculates the pointed position based on the detection outputs from two sensor units which correspond to the pointed position and detect light beams reflected by retroreflecting units, and the correction data stored in the memory unit.

5. The apparatus according to claim 1, wherein the storage unit stores, in the memory unit, correction data calculated based on respective coordinates of the common position corresponding to a plurality of combinations that are calculated based on the respective combinations.

6. The apparatus according to claim 1, wherein the calculation unit calculates the pointed position based on a relative positional relationship between the sensor units that is calculated based on detection outputs from the at least four sensor units, detection outputs from two sensor units corresponding to the pointed position, and the correction data stored in the memory unit.

7. The apparatus according to claim 1, wherein a first retroreflecting unit is interposed between a first sensor unit and a second sensor unit out of the at least four sensor units, and a second retroreflecting unit is interposed between a third sensor unit and a fourth sensor unit, and the correction data is calculated based on an angle defined by the second sensor unit and the fourth sensor unit when viewed from the first sensor unit, and at least three of four angles:

an angle defined by the third sensor unit and the fourth sensor unit when viewed from the first sensor unit;

an angle defined by the third sensor unit and the fourth sensor unit when viewed from the second sensor unit;

an angle defined by the first sensor unit and the second sensor unit when viewed from the third sensor unit; and an angle defined by the first sensor unit and the second sensor unit when viewed from the fourth sensor unit.

8. A coordinate input apparatus which detects a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave, comprising: a input unit configured to input a plurality of directions corresponding to remaining sensor units detected by the at least four sensor units; a calculation unit configured to calculate correction data based on the plurality of directions corresponding to the remaining sensor units detected by the at least four sensor units; and wherein said a storage unit configured to store, in a memory unit, the correction data calculated based on the plurality of directions corresponding to the remaining sensor units detected by one of the four sensor units, wherein the calculation unit is configured to calculate the pointed position based on the detection outputs from two sensor units corresponding to the pointed position, and on the correction data stored in the memory unit.

9. The apparatus according to claim 8, wherein the input unit is configured to input the plurality of directions corresponding to lights projected by the remaining sensor units detected by the at least four sensor units, and the calculation unit is configured to calculate the correction data based on the plurality of the directions corresponding to the lights projected by the remaining sensor units.

10. A coordinate input method of detecting a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave, comprising: inputting a plurality of directions corresponding to a common position detected by the at least four sensor units; calculating correction data based on the plurality of directions corresponding to the common position detected by the at least four sensor units; storing the correction data in a memory unit, and calculating the pointed position based on the detection outputs from two sensor units corresponding to the pointed position, and on the correction data values stored in the memory unit.

11. The method according to claim 10, wherein in the storing, the correction data is based on directions of remaining sensor units by using one of the four sensor units as a reference, and respective detection outputs of a plurality of combinations for the common position are stored in the memory unit.

12. The method according to claim 10, wherein in the storing, the correction data based on respective detection outputs of a plurality of combinations for the common position corresponding to an intersection of line segments connecting the at least four sensor units is stored in the memory unit.

13. A storage medium storing a computer program for detecting a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave, the computer program comprising: inputting a plurality of directions corresponding to a common position detected by the at least four sensor units; calculating correction data based on the plurality of directions corresponding to the common position detected by the at least four sensor units: storing the correction data in a memory unit, and calculating the pointed position based on the detection outputs from two sensor units corresponding to the pointed position, and on the correction data stored in the memory unit.

14. The medium according to claim 13, wherein in the storing, the correction data based on directions of remaining sensor units by using one of the four sensor units as a reference, and respective detection outputs of a plurality of combinations for the common position is stored in the memory unit.

15. The medium according to claim 13, wherein in the storing, the correction data based on respective detection outputs of a plurality of combinations for the common position corresponding to an intersection of line segments connecting the at least four sensor units is stored in the memory unit.

16. A coordinate input method of detecting a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave; comprising: inputting a plurality of directions corresponding to remaining sensor units detected by the at least four sensor units; calculating correction data based on the plurality of directions corresponding to the remaining sensor units detected by the at least four sensor units; storing, in the memory units, the correction data calculated based on the plurality of the plurality of directions corresponding to the remaining sensor units; and calculating the pointed position based on the detection outputs from two sensor units corresponding to the pointed position, and on the correction data stored in the memory unit.

17. The method according to claim 16, wherein the input step inputs the plurality of directions corresponding to lights projected by the remaining sensor units detected by the at least four sensor units, and the calculation step calculates the correction data based on the plurality of the directions corresponding to the lights projected by the remaining sensor units.

18. A storage medium storing a computer program for detecting a position pointed in a region surrounded by at least four sensor units, based on detection outputs from two sensor units corresponding to the pointed position out of the at least four sensor units, an arithmetic control circuit of each sensor bar controls the two sensor units, the operation between the arithmetic control circuits is executed by master-slave, the computer program comprising: inputting a plurality of directions corresponding to remaining sensor units detected by the at least four sensor units; calculating correction data based on the plurality of directions corresponding to the remaining sensor units detected by the at least four sensor units; storing, in the memory units, the correction data calculated based on the plurality of the plurality of directions corresponding to the remaining sensor units; and calculating the pointed position based on the detection outputs from two sensor units corresponding to the pointed position, and on the correction data stored in the memory unit.

19. The medium according to claim 18, wherein the input step inputs the plurality of directions corresponding to lights projected by the remaining sensor units detected by the at least four sensor units, and the calculation step calculates the correction data based on the plurality of the directions corresponding to the lights projected by the remaining sensor units.

* * * * *